(12) United States Patent
Cornell et al.

(10) Patent No.: US 6,553,966 B2
(45) Date of Patent: Apr. 29, 2003

(54) METHOD OF PRESETTING AN INTERNAL COMBUSTION ENGINE

(75) Inventors: Sean O. Cornell, Gridley, IL (US); Richard H. Holtman, Dunlap, IL (US); Scott A. Leman, Eureka, IL (US); Ronald D. Shinogle, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/808,226

(22) Filed: Mar. 14, 2001

(65) Prior Publication Data

US 2001/0023682 A1 Sep. 27, 2001

Related U.S. Application Data

(60) Provisional application No. 60/189,187, filed on Mar. 14, 2000.

(51) Int. Cl.$^7$ .............................. F02M 47/00; F01L 9/00
(52) U.S. Cl. ................. 123/446; 123/90.11; 123/90.12; 123/90.14; 123/179.1
(58) Field of Search ........................... 123/90.11, 90.12, 123/90.13, 90.14, 179.1, 179.3, 179.16, 179.17, 179.18, 446, 491

(56) References Cited

U.S. PATENT DOCUMENTS

| | | | |
|---|---|---|---|
| 4,260,112 A | * | 4/1981 | Grgurich ................. 239/533.8 |
| 5,003,938 A | * | 4/1991 | Erickson et al. ......... 123/90.14 |
| 5,410,994 A | * | 5/1995 | Schechter ................. 123/90.12 |
| 5,970,956 A | * | 10/1999 | Sturman ..................... 123/508 |
| 6,012,644 A | * | 1/2000 | Sturman et al. .............. 239/96 |
| 6,357,409 B1 | * | 3/2002 | Haghgooie et al. ...... 123/179.3 |
| 6,374,783 B1 | * | 4/2002 | Toriumi ................... 123/90.11 |

* cited by examiner

Primary Examiner—Tony M. Argenbright
(74) Attorney, Agent, or Firm—Liell & McNeil

(57) ABSTRACT

In many cases, intake and/or exhaust valves and fuel injector plungers are desirably placed in a predetermined condition prior to starting the engine. In hydraulic systems, leakage and thermal contraction can lead to pressure loss during a period of non-operation, thereby allowing the components to move away from the predetermined condition. Similar concerns arise with the use of residual electromagnetic force, which can decay over time. In the case of intake/exhaust valves, for example, such undesired movement can led to a potential collision between the valves and the engine piston during starting. This invention provides a system and method for presetting the engine and/or the components thereof to the predetermined condition just prior to starting the engine.

13 Claims, 3 Drawing Sheets

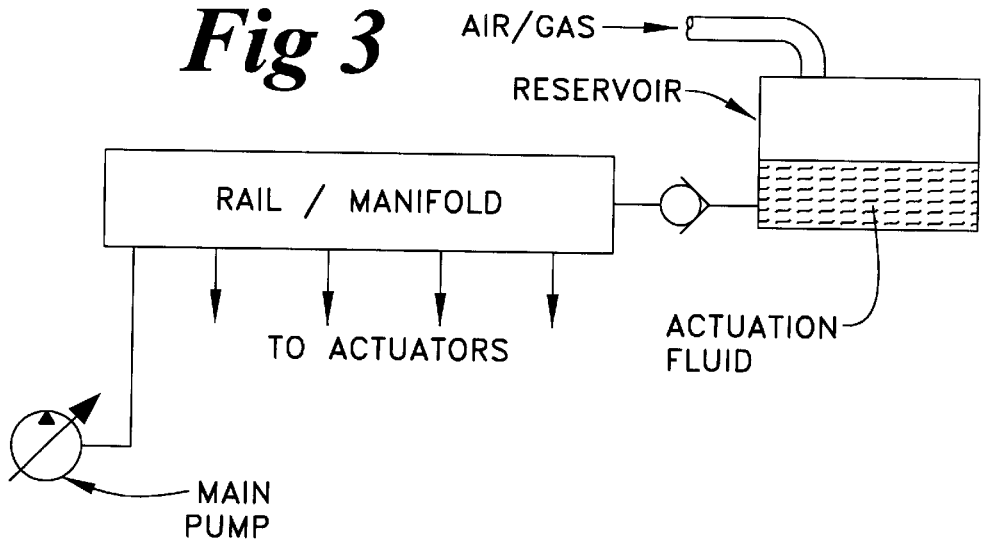
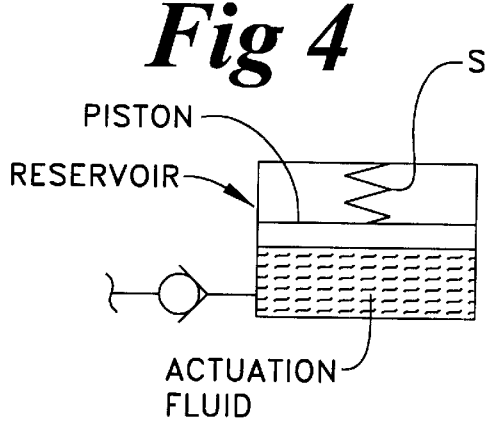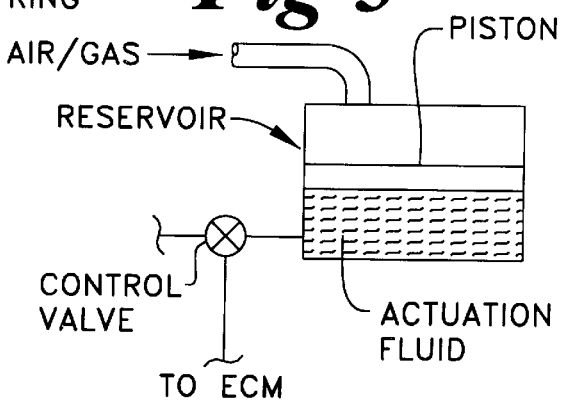
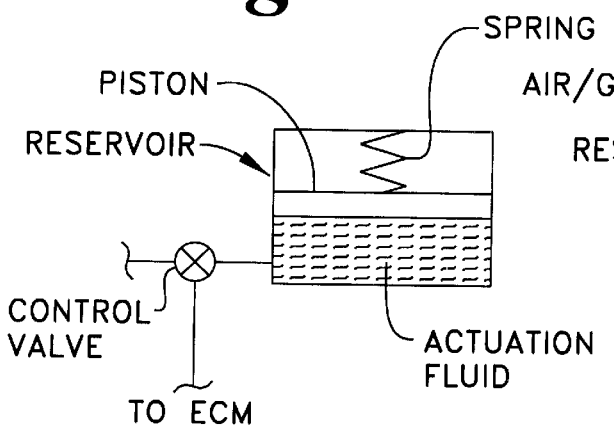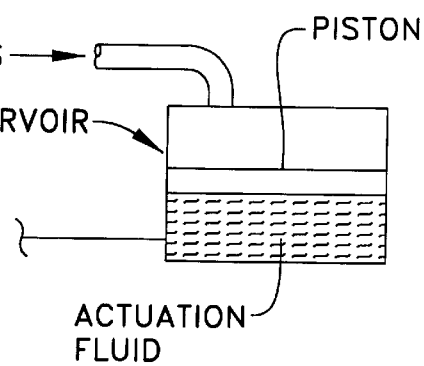

METHOD OF PRESETTING AN INTERNAL COMBUSTION ENGINE

CROSS-REFERENCE TO RELATED APPLICATIONS

This application claims the benefit of commonly-owned provisional application No. 60/189,187, filed Mar. 14, 2000.

TECHNICAL FIELD

This invention relates to internal combustion engines and, more particularly, to presetting the engine and/or fuel injection components thereof to a predetermined condition prior to starting

BACKGROUND ART

The benefits of variable timing of intake and exhaust valves in reciprocating internal combustion engines are well known and include, among others, improved emissions and fuel consumption. Variable valve timing, in many cases, is achieved by replacing traditional cam-operated valve actuation systems with independent hydraulic or electrical actuators to control the opening and closing of the intake and exhaust valves. As a result, such engines are typically referred to as camless engines. The hydraulic or electrical actuators associated with each valve may be operated to open or close the valves at any desired point during the engine cycle to optimize engine performance in terms of emissions, brake specific fuel consumption, power and torque, etc. One skilled in the art will also recognize that variable valve timing is also beneficial when operating the engine with a compression release brake cycle to optimize the braking power available.

Examples of hydraulically operated camless engines are shown in U.S. Pat. No. 5,829,396 (Sturman) and U.S. Pat. No. 5,970,956 (Sturman), which are incorporated herein by reference. Another example of a hydraulically operated camless engine is also shown in commonly-owned U.S. Pat. No. Re. 35,303 (Miller et al.), which is also incorporated herein by reference.

In traditional, cam operated valve systems, a coil spring or the like is provided to bias the intake and exhaust valves to the closed position. However, hydraulic camless systems such as those shown in the Sturman '396 and '956 patents may be "springless" and rely on hydraulic pressure to both open the valves and also to return the valves to the closed position. Consequently, the possibility exists that the valves will drop from their closed position due to gravity during periods in which the engine is not operating and hydraulic pressure or cylinder pressure is not available to maintain the valves in the closed position. In such cases, it is possible that an undesirable collision may occur between the piston and the valves when starting the engine. This problem may also occur when using double acting electrical valve actuation if insufficient force is provided to latch or otherwise maintain the valves in their closed condition when the engine is not running.

In the case of hydraulic camless engines, hydraulically actuated fuel injection systems may be used to beneficially rely on a common high pressure hydraulic system. For example, the aforementioned Re. 35,303 patent utilizes hydraulic valve actuation and a hydraulically actuated fuel injector. Of course, hydraulically actuated fuel injectors may also be used in traditional, cam operated engine applications. In many traditional hydraulically actuated fuel injectors, high pressure fluid is used to drive a pumping plunger to pressurize and thereby inject fuel into the combustion chamber. The plunger is returned to its original position by a return spring, with the return stroke drawing a supply of fuel into the pumping chamber for the next injection event. However, hydraulically actuated fuel injectors such as those shown in U.S. Pat. No. 6,012,644 (Sturman), which is incorporated herein by reference, are "springless" and rely on hydraulic pressure to return the fuel injector plunger to its initial raised position, i.e. its position at the beginning of the full pumping stroke. As with the double acting hydraulic valve actuation systems mentioned above, the plunger is likely to drop due to gravity from raised position over time when the engine is not running. In addition, it is possible that the plunger may stop in other that its raised position when the engine is shut down. In either case, it is probable that the injector plunger will not be in its raised position when the engine is restarted, thus causing starting to be difficult or in some cases even precluding starting of the engine.

In some hydraulic valve actuation systems, pressure is maintained in the hydraulic circuit during period in which the engine is not operated by intermittently operating an auxiliary pump that supplies pressurized fluid to the system. An example of such a system, including a hydraulic valve actuation system in general, is illustrated in U.S. Pat. No. 5,410,994 (Schechter), which is incorporated herein by reference. While the system illustrated in the Schechter '994 patent can provide a solution to the valve dropping concerns described above and the potential collision between piston and the engine valves during starting of the engine, the Schechter systems presents several additional challenges. For example, a system as illustrated in the Schechter '994 patent requires the auxiliary pump to be powered between periods of engine operation perhaps several times—which can cause a drain on the electrical system. Moreover, over long periods of non-operation, the system can become unpressurized due to a lack of electrical power, thereby permitting the aforementioned valve-piston collisions concerns to arise.

This invention is directed to overcoming one or more of foregoing problems.

DISCLOSURE OF THE INVENTION

In one aspect of this invention, a method of presetting an engine to a predetermined condition prior to starting is provided. The method comprises the steps of (a) providing an engine having unbiased components that have a tendency to move away from the predetermined conditions during period in which the engine is not operated; (b) prior to starting the engine, selectively supplying power to the unbiased components to position the components in the predetermined condition; and (c) thereafter, starting the engine.

In another aspect of this invention, an engine system for use with an internal combustion engine comprises a plurality of components forming a combustion system, at least some of the components have a predetermined condition for engine starting and being unbiased and further having a tendency to move away from the predetermined position during periods in which the engine is not operated. The engine system also comprises a starting system. The starting system comprises both a presetting system for selectively supplying power to the unbiased components to position the components is the predetermined condition and a cranking system operable independently of the presetting system for operating the engine until the engine achieves sustained combustion.

In yet another aspect of this invention, a method of starting an engine in a predetermined condition is disclosed. The method comprises the steps of (a) providing an engine having unbiased components that have a tendency to move away from the predetermined conditions during a period in which the engine is not operated; and (b) starting the engine. The starting step comprising the steps of (a) supplying power to the unbiased components to position the components in the predetermined condition; and (b) thereafter, powering the engine until the engine achieves sustained combustion.

DESCRIPTION OF THE DRAWINGS

FIG. 3 is a diagrammatic representation of a third embodiment of a presetting system in accordance with this invention.

FIGS. 4 through 7 are diagrammatic representations of alternatives to a pressurization portions of the presetting system illustrated in FIG. 3.

DESCRIPTION OF THE INVENTION

Figure 1:
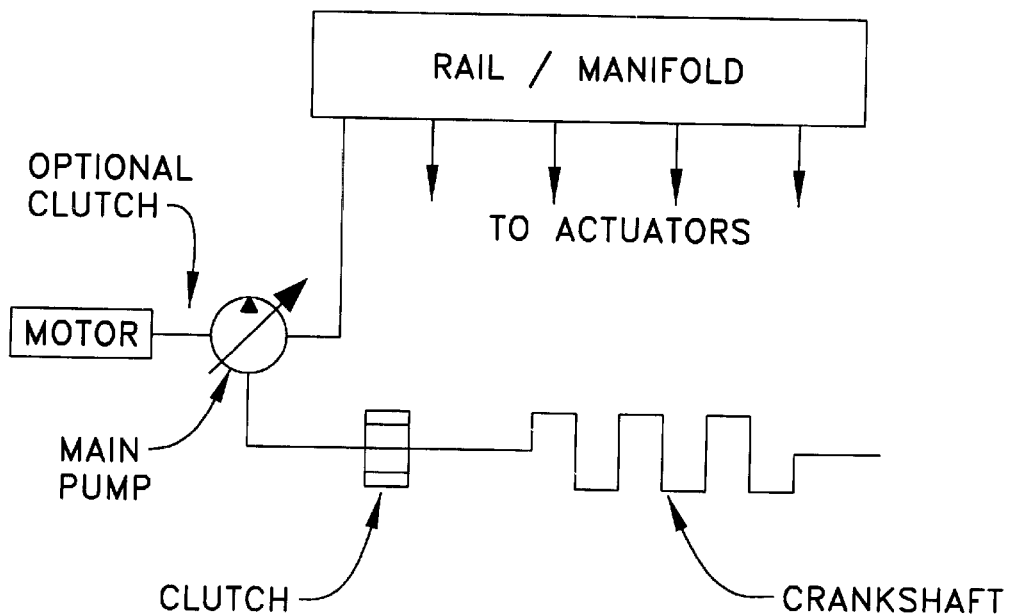
FIG. 1 is a diagrammatic representation of system in accordance with this invention for presetting an internal combustion engine or components thereof to a predetermined condition prior to starting.
Figure 2:
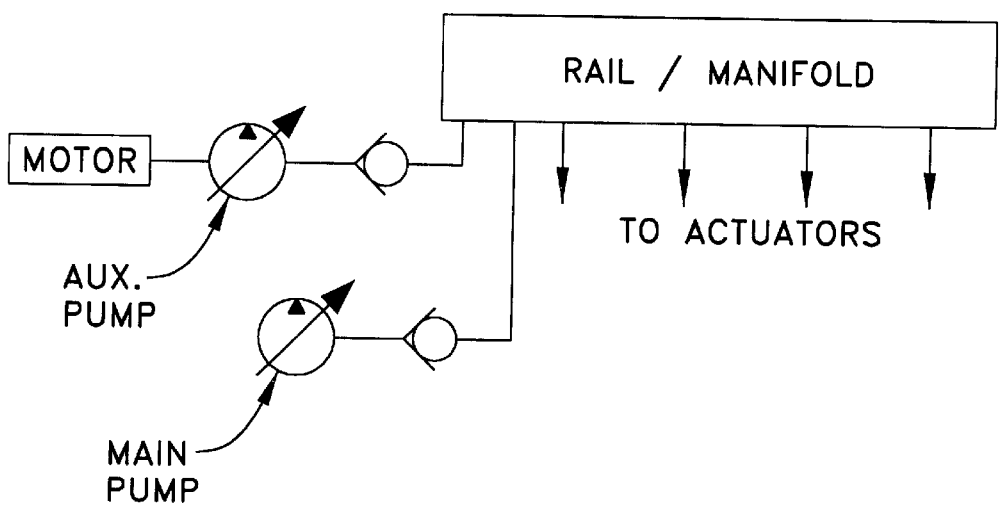
FIG. 2 is a diagrammatic representation of a second embodiment of a presetting system in accordance with this invention.

To avoid the problems described above associated with "springless" engine components, it is desirable to preset the engine to a "starting condition" prior to starting the engine (as used herein, the term "starting" includes the action of cranking the engine, via a battery operated starter, for example, until the engine achieves sustained combustion). For example, the intake and exhaust valves should be preset to their closed positions and the fuel injector plungers should be preset to its raised position corresponding to the start of its pumping stroke. In the case of electrically actuated valves, such presetting may be accomplished by operating the electrical valve actuators to close the valves prior to cranking the engine. For hydraulically actuated systems, presetting may be accomplished using an auxiliary fluid pump to pre-pressurize the system prior to cranking the engine (FIG. 2). An electrical motor driven from a starter battery may power such auxiliary pump, for example. Alternatively, an electric motor may be provided to drive the main hydraulic pump, with a clutch mechanism being provided between the main pump and the engine crankshaft so that operation of the main pump does not also turn the crankshaft (FIG. 1). In this configuration, it may be desirable to have a clutch that disengages the electric motor from the main pump when the pump and crankshaft are engaged. Thus, when the starter is operated to turn the crank and drive the main pump, the auxiliary electric motor is not turned. Also, it will be recognized that an arrangement could be used in which the starter motor serves as the auxiliary motor for driving the main pump (or the auxiliary pump mentioned above for that matter) prior to cranking the engine. In the case of "free piston" engines that have no crankshaft and rely on hydraulics to control the reciprocating motion of the piston, presetting may be accomplished by simply pre-pressurizing the valve actuation system and the fuel injection system while not providing pressure to move the pistons. In connection with free piston engines, those skilled in the art will recognize that the starting method for those engines differs from the method for conventional engines having crankshafts, but that this invention may be applied to free piston engines.

Referring to FIGS. 3 and 7, another alternative for pre-pressurization is to provide a reservoir or accumulator for hydraulic actuation fluid that may be pressurizing prior to cranking the engine, as by application of high pressure air above the surface of actuation fluid in an accumulator connected with the high pressure rail or manifold used to provide actuation fluid to valve actuators, fuel injectors, or the like. In the case of on-highway truck applications, this may be beneficial since many such trucks are provided with air compressing systems for other uses. The high pressure air or other gas may be applied to the accumulator just prior to starting the engine to thereby pre-pressurize the hydraulic actuation system. Alternatively, as shown in FIG. 5, high pressure gas may be stored above the fluid during engine operation for use in a later starting event, in which case an electronic control valve may be provided between the accumulator and the rail or manifold to release the high pressure actuation fluid just prior to starting in order to pre-pressurize the system. As will be apparent with reference to FIGS. 4 and 6, the pressurization force provided by the gas may also be provided by a spring biased pressurization piston in cases where the pressure needed to pre-pressurize and preset the system is not extreme.

It will be noted that the use of an auxiliary actuation fluid pump or other systems to pre-pressurize the system also provides thermal make-up for contraction of the fluid while the engine was not running. This is a concern especially in cold start conditions. Accordingly, the systems as described herein may provide an opportunity to forgo a separate thermal make-up reservoir as currently utilized in the art.

Figure 8:
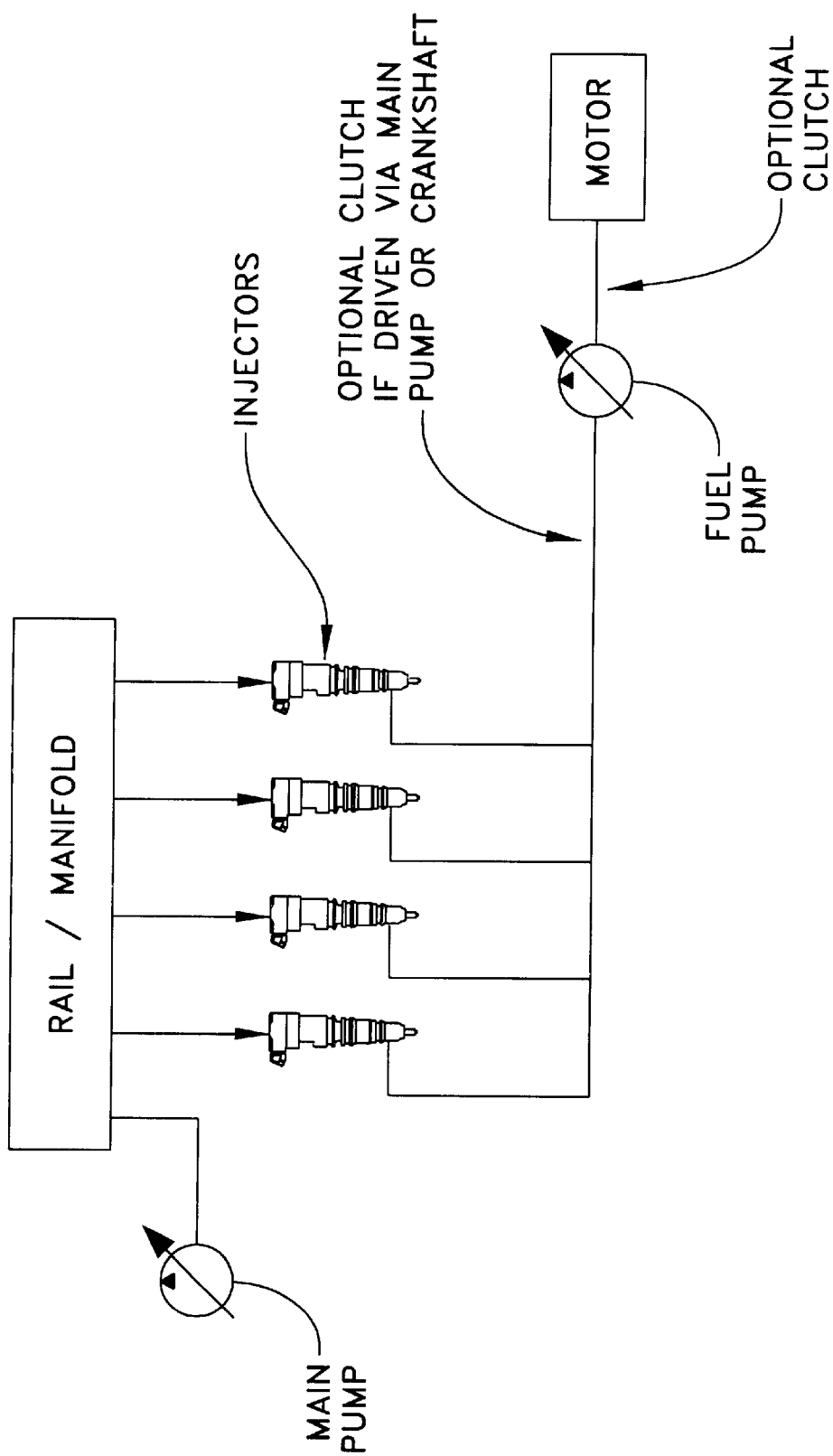
FIG. 8 is a diagrammatic representation of a fourth embodiment of a presetting system in accordance with this invention.

With reference to FIG. 8, in the case of the aforementioned hydraulically actuated fuel injectors, the plunger may be returned to its raised position by applying low pressure fuel via the fuel transfer pump to the fuel pressurization chamber prior to starting the engine. In this case, the fuel transfer pump would be operated prior to cranking the engine or, alternatively, an auxiliary fuel transfer pump could be provided. This arrangement would be useful in cases where only the fuel injectors require presetting.

Those skilled in the art will also recognize that presetting of components in accordance with this invention may be equally applicable to electromagnetically operated components, such as electromagnetically operated engine intake/exhaust valves. In the case of electromagnetically-operated components, power is applied the components to be preset prior to cranking the engine.

Although the preferred embodiments of this invention have been shown and described, those skilled in the art will recognize that substantial changes may be made without departing from the spirit and scope of the following claims.

What is claimed is:

1. A method of presetting an engine to a predetermined condition prior to starting, comprising:

providing an engine having unbiased components that have a tendency to move away from said predetermined conditions during periods in which the engine is not operated;

prior to starting said engine, selectively supplying power to said unbiased components to position said components in said predetermined condition;

thereafter, starting said engine; and said unbiased components are hydraulically powered and said step of supplying power comprises supplying hydraulic power.

2. The method of claim 1 wherein at least one of said unbiased components comprises an engine intake or exhaust valve.

3. The method of claim 1 wherein at least one of said unbiased components comprises the plunger of a hydraulically actuated fuel injector.

4. A method of presetting an engine to a predetermined condition prior to starting, comprising:
   providing an engine having unbiased components that have a tendency to move away from said predetermined conditions during periods in which the engine is not operated;
   prior to starting said engine, selectively supplying power to said unbiased components to position said components in said predetermined condition;
   thereafter, starting said engine; and
   said unbiased components are electrically powered and said step of supplying power comprises supplying electric power.

5. The method of claim 4 wherein at least one of said unbiased components comprises an engine intake or exhaust valve.

6. The method of claim 4 wherein at least one of said unbiased components comprises the plunger of a hydraulically actuated fuel injector.

7. An engine system for use with an internal combustion engine, comprising:
   a plurality of components forming a combustion system, at least come of said components have a predetermined condition for engine starting and being unbiased and further have a tendency to move away from said predetermined position during periods in which the engine is not operated, and
   a starting system, comprising:
      a presetting system for selectively supplying power to said unbiased components to position said components in said predetermined condition;
      a cranking system operable independently of said presetting system for operating said engine until said engine achieves sustained combustion; and
      said presetting system supplies hydraulic power to said unbiased components.

8. The engine system of claim 7 wherein at least one of said unbiased components comprises an engine intake or exhaust valve.

9. The engine system of claim 7 wherein at least one of said unbiased components comprises the plunger of a hydraulically actuated fuel injector.

10. An engine system for use with an internal combustion engine, comprising:
    a plurality of components forming a combustion system, at least come of said components have a predetermined condition for engine starting and being unbiased and further have a tendency to move away from said predetermined position during periods in which the engine is not operated, and
    a starting system, comprising:
       a presetting system for selectively supplying power to said unbiased components to position said components in said predetermined condition;
       a cranking system operable independently of said presetting system for operating said engine until said engine achieves sustained combustion; and
       said presetting system supplies electrical power to said unbiased components.

11. The engine system of claim 10 wherein at least one of said unbiased components comprises an engine intake or exhaust valve.

12. The engine system of claim 10 wherein at least one of said unbiased components comprises the plunger of a hydraulically actuated fuel injector.

13. A method of starting an engine in a predetermined condition, comprising:
    providing an engine having unbiased components that have a tendency to move away from said predetermined conditions during a period in which the engine in not operated;
    starting said engine, said starting step comprising the steps of:
       supplying one of electrical power and hydraulic power to said unbiased components to position said components in said pre-determined condition; and
       thereafter, powering said engine until said engine achieves sustained combustion.

\* \* \* \* \*